Patented Sept. 22, 1931

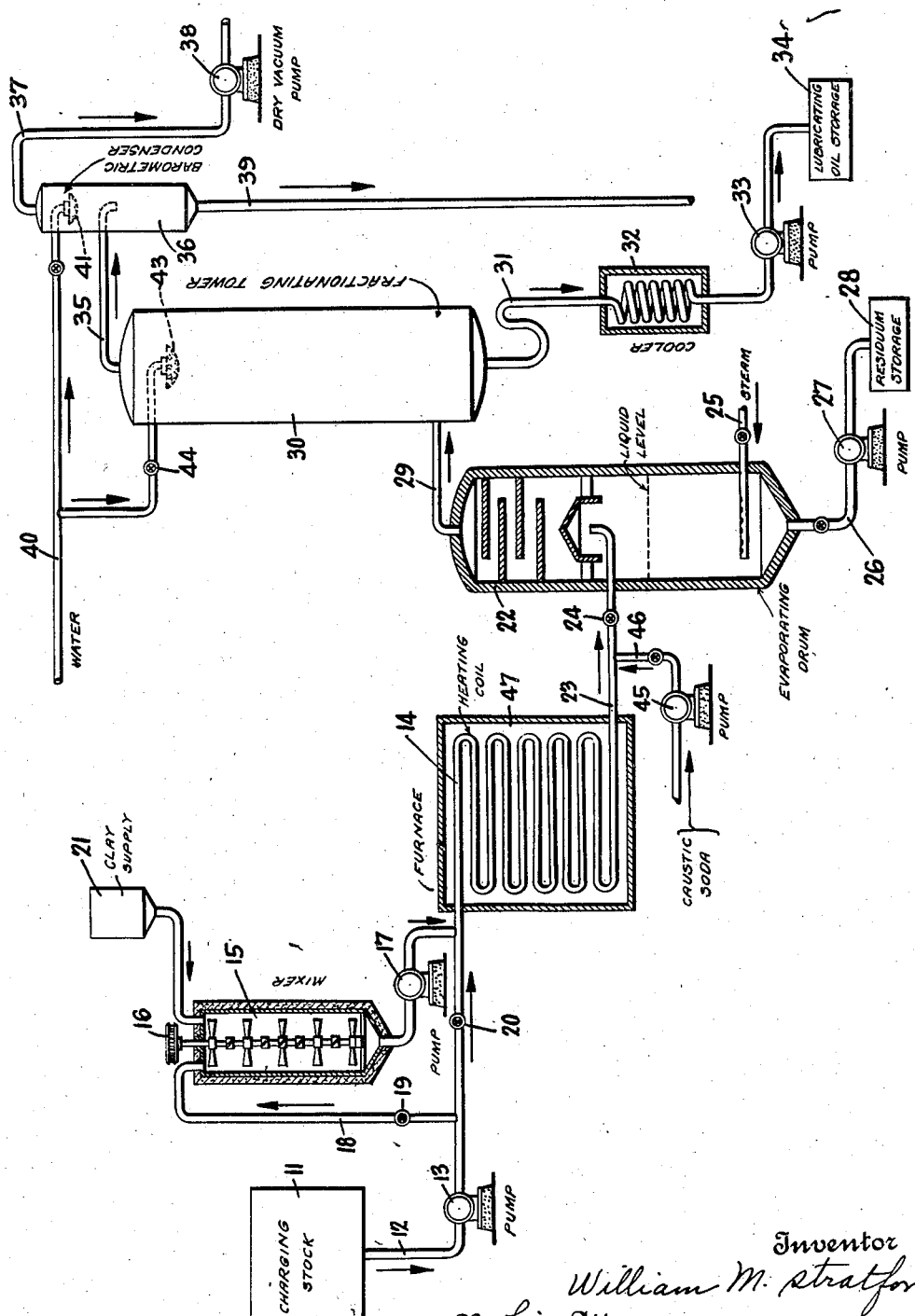

1,823,994

UNITED STATES PATENT OFFICE

WILLIAM M. STRATFORD, OF PORT ARTHUR, TEXAS, ASSIGNOR TO THE TEXAS COMPANY, OF NEW YORK, N. Y., A CORPORATION OF DELAWARE

TREATING HYDROCARBON OIL

Application filed January 13, 1928. Serial No. 246,423.

This invention relates to treating hydrocarbon oil and more particularly to a process of treating lubricating oil derived from petroleum. Broadly, the invention comprises a process wherein hydrocarbon lubricating oil, which may or may not have received previous treatment with acid, is distilled at pressures less than atmospheric in the presence of an adsorbent decolorizing material which is highly efficient within the range of the distillation temperatures.

By the practice of the present invention, hydrocarbon lubricating oils may be economically refined to yield products of the very highest degree of purity having corresponding desirable properties of color stability and resistance to emulsification and oxidation. The invention may be readily understood from a description of the process considered in connection with the accompanying drawing which represents in diagrammatic sectional elevation an apparatus which may be employed for carrying on the process. The apparatus illustrated in the drawing is shown and described merely for the purpose of aiding in understanding the process and it is to be understood that any other suitable apparatus may be substituted for that shown.

Referring to the drawing, there is provided a suitable source of a charging stock, such as the tank 11, connected through the charging line 12 with the charging pump 13, which forces the charge to the heating coil 14. A mixer 15 is provided with suitable agitating means 16 and is connected through the pump 17 to the charging line 12 at a point just preceding the entrance of the charging line to the heating coil 14. A by-pass line 18 is provided as a branch of the charging line 12 and leads to the mixer 15 thus providing a means for introducing a portion of the oil charge to the mixer. The amount of oil introduced into the mixer through the line 18 may be regulated by the manipulation of the valves 19 and 20. A clay supply, as the tank 21, is also connected to the mixer 15, providing means for introducing clay into the mixer.

The heating coil 14 is connected to an evaporating drum 22 through the line 23 fitted with the valve 24. The evaporating drum is supplied with a suitable steam connection, such as the perforated pipe 25, placed below the normal liquid level maintained in the drum. A draw-off line 26 is provided connecting to a pump 27 which discharges to the residuum storage tank 28. The evaporating drum may be fitted with suitable baffles, as shown, for the prevention of entrainment.

From the upper portion or vapor space of the evaporating drum, a vapor line 29 leads to a fractionating column 30, which may be of any suitable type such as a packed column or a bubble column. From the lower portion of the column a condensate line 31 leads through a cooler 32 to a pump 33 which discharges to the lubricating oil storage tank 34. From the upper portion of the fractionating column the vapor line 35 leads to the barometric condenser 36. From the top of the barometric condenser a line 37 connects to the dry vacuum pump 38 while, from the lower portion of the barometric condenser, a discharge line 39 leads to a suitable hot-well system (not shown). Water for supplying cooling to the barometric condenser is introduced through the line 40 and the distributor 41. A branch of the line 40 enters the tower in the upper portion and may supply reflux cooling thereto by spraying water through the distributor 43, the quantity being controlled by means of the valve 44.

It may be desirable under certain conditions to carry on the distillation in the presence of an alkali such as caustic soda. Therefore a suitable means is provided, such as the pump 45, which draws caustic solution from a source of supply (not shown). The pump discharges through the line 46, connected to the line 23 leading into the evaporating drum 22.

In the preferred manner of practicing the invention with the apparatus illustrated in the drawing, a suitable stock for the manufacture of lubricating oil may be used, such for example as an intermediate distillate fraction from a Gulf coastal crude petroleum. The stock may or may not have received a preliminary refining treatment. In certain instances it may be desirable to treat the oil with sulfuric acid in the usual way before subjecting it to the distillation in the presence of adsorbent material. The adsorbent decolorizing material used must necessarily have the property of exhibiting its greatest activity at temperatures within the range of the distillation temperatures used. Preferably, the adsorbent decolorizing material may be an acid-treated clay of the montmorillonite type, which exhibits its greatest decolorizing efficiency at temperatures in excess of 250° F.

The charging stock is drawn from the source of supply, the tank 11, through the charging line 12 and is forced through an extension thereof by means of the pump 13 to the heating coil 14 placed in the furnace 47. It is desirable to mix the decolorizing clay with the oil before its passage through the heating coil 14 and, accordingly, a mixer 15 is provided, having a suitable agitating device 16 installed therein. Decolorizing clay from the clay supply 21 is supplied to the mixer wherein it is mixed with a relatively small quantity of oil to form a suspension or slurry which may be pumped, by means of the pump 17, into the flowing stream of the oil charge passing through the line 12. The oil used in making the suspension or slurry of clay may be a portion of the charging stock and, accordingly, a by-pass line 18, fitted with a valve 19, is connected to the charging line 12. By the proper manipulation of the valve 19 and a valve 20 in the charging line 12, a suitable proportion of the charging stock for forming the suspension may be by-passed through the mixer 15. If desired, the clay may be mixed with water instead of oil to form a suspension in the mixer 15.

The mixture of oil and clay passes through the heating coil 14 which is heated by means of the furnace 47. The temperatures to which the oil is heated will depend somewhat upon its characteristics and also upon the degree of distillation to which the oil is to be subjected. Ordinarily, to obtain a reasonable amount of distillation and also to obtain the benefits of the greatest decolorizing power of the clay, the oil will be heated to a temperature in excess of 500° F. and usually about 600° to 625° F. it of course being undesirable to heat the oil to a temperature high enough to produce any substantial amount of cracking. The reaction between the clay and the oil at the temperatures prevailing in the heating coil is extremely rapid and ordinarily will have progressed substantially to completion by the time the oil has passed through the coil. The heated mixture of oil and clay is discharged from the heating coil 14 through the line 23 into the evaporating drum 22 which is maintained under a reduced pressure, preferably below 60 to 70 mm. mercury. As the heating coil is under atmospheric pressure or above, the valve 24 in the line 23 is partially closed to provide the correct flow into the evacuated drum 22.

If desired an alkaline material such as caustic soda may be introduced into the flowing stream of oil and clay passing through the line 23, the caustic being forced in by means of the pump 45 to the line 46. The purpose of the caustic soda is to thoroughly neutralize any acidic bodies in the oil and to prevent their being distilled out of the evaporating drum 22.

The heated oil entering the evacuated drum 22 through the line 23 is vaporized to a large extent, the vapors passing upward through the baffles in the upper portion of the drum and thence through the vapor line 29 to the fractionating tower 30. If desired, additional heat may be applied to the drum 22 to aid in effecting distillation. The unvaporized portion of the oil collects in a pool in the lower portion of the drum 22 and steam may be injected through the perforated pipe 25 to aid in vaporizing the more volatile portions thereof. The heaviest fractions of the oil, together with the clay, are drawn off through the line 26 and pumped by means of the pump 27 to the storage tank 28 which is maintained under substantial atmopsheric pressure.

The vapors entering the fractionating tower are subjected to fractionation therein, cooling being supplied to the tower by direct contact with water from the line 40 introduced through the distributor 43. In the apparatus as shown, it is desirable that substantially all of the vapors be condensed in the tower 30 and the quantity of water injected into the top of the tower is regulated accordingly. The uncondensed vapors, consisting of a small quantity of oil vapors, the steam which was injected into the drum 22 through the connection at 25, and the steam generated from the injection of water into the top of the tower, pass through the vapor line 35 to the barometric condenser 36 where they come in contact with cool water introduced through the distributor 41. The vapors are thus condensed and produce a vacuum on the system. The condensate from the barometric condenser flows through the line 39 to a suitable hot-well system which is not shown in the drawing. Uncondensable gases are drawn off through the line 37 at the top of the barometric condenser by means of the dry vacuum pump 38.

It has already been mentioned that the greater portion of the oil vaporized in the drum 22 is condensed in the fractionating tower 30. The condensate collects in the bottom of the tower and flows through the line 31 and the cooler 32 to a pump 33 which forces it to a storage receptacle maintained under atmospheric pressure. The condensate from the tower represents the finished distillate lubricating oil, which is capable of resistance to color changes and to oxidation to a degree unapproached by oil produced by the usual refining methods.

Although the invention has been described in connection with a specific type of oil and an adsorbent decolorizing clay from a particular source, it will be understood that processes comprising the invention may be equally applicable to many different types of oil and that numerous varieties of adsorbent decolorizing materials may be used, providing they have the property of decolorizing at elevated temperatures.

Obviously many modifications and variations of the invention, as hereinbefore set forth, may be made without departing from the spirit and scope thereof, and therefore, only such limitations should be imposed as are indicated in the appended claims.

I claim:

1. The process of treating and purifying hydrocarbon lubricating oil which comprises distilling the oil under vacuum without substantial decomposition in the presence of an alkali and an adsorbent decolorizing material which is most efficient at temperatures in excess of about 250° F., whereby the purified lubricating oil is collected as a distillate.

2. The process of treating and purifying hydrocarbon lubricating oil which comprises mixing the oil with an adsorbent decolorizing material which is most efficient at temperatures in excess of about 250° F., heating the mixture of adsorbent material and oil to a temperature in excess of 500° F., and then subjecting the heated mixture to distillation under a vacuum in the presence of an alkali without substantial decomposition, whereby the purified lubricating oil is collected as a distillate.

3. The process of treating and purifying hydrocarbon lubricating oil which comprises mixing the oil with an adsorbent decolorizing material which is most efficient at temperatures in excess of about 250° F., introducing a relatively small quantity of an alkali into the oil and then subjecting the heated mixture to distillation under a vacuum without substantial decomposition, whereby the purified lubricating oil is collected as a distillate.

4. The process of treating and purifying hydrocarbon lubricating oil which comprises treating the oil with sulfuric acid and then distilling under vacuum without substantial decomposition in the presence of an alkali and an adsorbent decolorizing material which is most efficient at temperatures in excess of about 250° F., whereby the purified lubricating oil is collected as a distillate.

In witness whereof, I have hereunto set my hand this 24th day of December, 1927.

WILLIAM M. STRATFORD.